United States Patent [19]

Nozaki et al.

[11] Patent Number: 4,822,647
[45] Date of Patent: Apr. 18, 1989

[54] COATING AGENT TO COATING ROBOT, INCLUDING A METHOD AND ARRANGEMENT FOR PROTECTING THE APPARATUS FROM DAMAGE DUE TO IMPROPER PRESSURES IN A SUPPLY LINE

[75] Inventors: Hiroyoshi Nozaki; Zenichi Aida, both of Saitama; Hirofumi Hara, Tokyo; Toshihiko Satake, Saitama; Hiroshi Mitsuyoshi, Saitama; Masayasu Arakawa, Saitama; Koji Hatanaka, Saitama, all of Japan

[73] Assignee: Honda Giken Kogyo Kabushiki Kaisha, Tokyo, Japan

[21] Appl. No.: 41,849

[22] Filed: Apr. 23, 1987

[30] Foreign Application Priority Data

Apr. 23, 1986 [JP]  Japan ................................ 61-93949
May 9, 1986 [JP]  Japan ................................ 61-106041

[51] Int. Cl.⁴ .............................................. B05D 1/02
[52] U.S. Cl. ................................. 427/421; 118/692;
  118/674; 118/683; 118/696; 901/43; 417/28;
  239/126
[58] Field of Search ................. 901/43; 239/126, 587;
  118/692, 698, 697, 696, 674, 683; 427/421;
  417/26, 28, 44

[56] References Cited

U.S. PATENT DOCUMENTS

| | | | |
|---|---|---|---|
| 1,860,603 | 5/1932 | Allen | 417/44 |
| 2,339,957 | 1/1944 | Smith | 417/28 |
| 3,164,325 | 1/1965 | Veum | 239/126 |
| 3,865,512 | 2/1975 | Deters | 417/26 |
| 4,061,271 | 12/1977 | Kimbrough | 239/126 X |
| 4,182,354 | 1/1980 | Bergstedt | 239/126 X |
| 4,530,862 | 7/1985 | Kerzel | 118/674 X |
| 4,593,360 | 6/1986 | Cocks | 118/696 X |
| 4,616,978 | 10/1986 | Matheson et al. | 417/26 X |
| 4,664,601 | 5/1987 | Uchida et al. | 417/45 X |
| 4,692,351 | 9/1987 | Maeda et al. | 118/697 X |
| 4,709,858 | 12/1987 | Stern et al. | 118/674 X |

FOREIGN PATENT DOCUMENTS 2561947 10/1947 France ........................ 118/696
55-81759  6/1980 Japan .

Primary Examiner—Shrive Beck
Assistant Examiner—Alain Bashore
Attorney, Agent, or Firm—Irving M. Weiner; Joseph P. Carrier; Pamela S. Burt

[57] ABSTRACT

A supply line for supplying a sealant from a sealant supply source to a sealing robot has pressure sensors and is coupled to relief valves through branch lines. If the pressure in the supply line excessively rises or drops, then the relief valves are opened to release the pressure from the supply line and the supply pump is inactivated. The pipes, devices, and pump on the supply line are therefore protected from damage. The sealing robot has an sealant applicator gun movable with respect to an article to which the sealant is to be applied by the sealing robot. A pump driving device is controlled to vary the rate at which the sealant is discharged from the pump as a function of the speed of relative movement of the sealant applicator gun with respect to the article.

15 Claims, 2 Drawing Sheets

COATING AGENT TO COATING ROBOT, INCLUDING A METHOD AND ARRANGEMENT FOR PROTECTING THE APPARATUS FROM DAMAGE DUE TO IMPROPER PRESSURES IN A SUPPLY LINE

BACKGROUND OF THE INVENTION

1. Field of the Invention:

The present invention relates to a method of and an apparatus for supplying a coating agent such as a sealant to a coating robot such as a sealing robot which applies the coating agent to required portions of an article conveyed on a conveyor line.

2. Description of the Relevant Art:

During assembly of various articles such as automotive bodies, for example, many portions or areas of such articles have to be sealed to make airtight and liquidtight the mating edges of panels which are joined together as by spot welding. Sealing the innermost area of an engine compartment, in particular, has resulted in various problems. The process of sealing that area is complex, but the area has to be sealed quickly. The manual sealing procedure is subject to limitations.

In view of the above drawbacks, there has recently been proposed a sealing robot disposed on a conveyor line and having a sealing gun for automatically carrying out a sealing process, the sealing robot being operable for sealing an article according to a working program (see Japanese Laid-Open Patent Publication No. 55-81759 published June 20, 1980).

The sealing robot is supplied with a sealant by a fixed-displacement sealant supply pump during the sealing process. In the event that the outlet side of the pump fails to discharge the sealant due for example to a clog, and undue pressure buildup is developed in the pipe connected to the pump outlet, and hence the pump and pipes and devices coupled thereto may be damaged. If the inlet side of the pump fails to deliver the sealant to the pump, the pump operates idly and may be damaged. Should the pipes remain pressurized after a sealing procedure has been completed, the sealant in the pipes would be solidified. To prevent this, the pipes should be relieved of any remaining pressure subsequent to the sealing process.

Another problem with the conventional sealing robot is that when the sealing robot is to be slowed down to change its direction of movement during a sealing operation or when the rate of discharge of the sealant from the pump is varied due to aging of the viscosity of the sealant, the amount of the sealant coated on the article per unit distance that the sealing robot has traversed is also varied, with the result that the sealant coat on the article becomes irregular. This problem manifests itself and should be solved especially when sealing the joined edges (joined lines) of panels which define an automotive engine compartment inasmuch as the joined edges are curved and the sealing robot moves at largely different speeds along the joined edges.

The present invention has been made in view of the aforesaid problems.

SUMMARY OF THE INVENTION

According to the present invention, there is provided an apparatus for supplying a coating agent to a coating robot, comprising a coating robot, a supply source of a coating agent, a supply line for supplying the coating agent in a direction from the supply source to the coating robot, the supply line including a supply pipe, a coating agent supply pump on the supply line, first and second pressure sensors disposed downstream and upstream, respectively, of the coating agent supply pump with respect to said direction, for detecting pressures in the supply pipe, branch lines extending from the supply line downstream of the first pressure sensor and upstream of the second pressure sensor, respectively, relief valves on the branch lines, respectively, the relief valves having respective actuators, a pump driving device for driving the coating agent supply pump, and control means operatively connected between the first and second pressure sensors, and the actuators and the pump driving device for controlling the pump driving device and the actuators to stop operation of the coating agent supply pump and to open the relief valves when the pressure detected by either one of the first and second pressure sensors falls outside of a prescribed pressure range.

According to the present invention, there is also provided a method of supplying a coating agent to a coating robot, comprising the steps of detecting pressures in a supply pipe downstream and upstream of a coating agent supply pump on a coating agent supply line extending from a supply source of a coating agent to a coating robot, releasing the pressure from the supply pipe through branch lines extending from the supply line downstream and upstream of the coating agent supply pump when the pressure in the supply pipe downstream or upstream of the coating agent supply pump falls outside of a prescribed pressure range, and stopping operation of the coating agent supply pump.

If the pressure in the supply line excessively rises or drops, then the relief valves are opened to release the pressure from the supply line and the supply pump is inactivated for thereby protecting the pipes, devices, and pump on the supply line from damage.

The coating robot has a coating applicator movable with respect to an article to which the coating agent is to be applied by the coating robot. The control means controls the pump driving device to vary the rate at which the coating agent is discharged from the pump as a function of the speed of relative movement of the coating applicator with respect to the article.

Therefore, the rate at which the coating agent is applied to the article remains constant irrespective of the speed of relative movement of the coating applicator with respect to the article, so that the sealed area of the article has a neat appearance and is made highly airtight and liquidtight.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

The principles of the present invention will hereinafter be described by way of illustrative example as being incorporated in a sealant supply system for supplying a sealant to a sealing robot.

Figure 1:
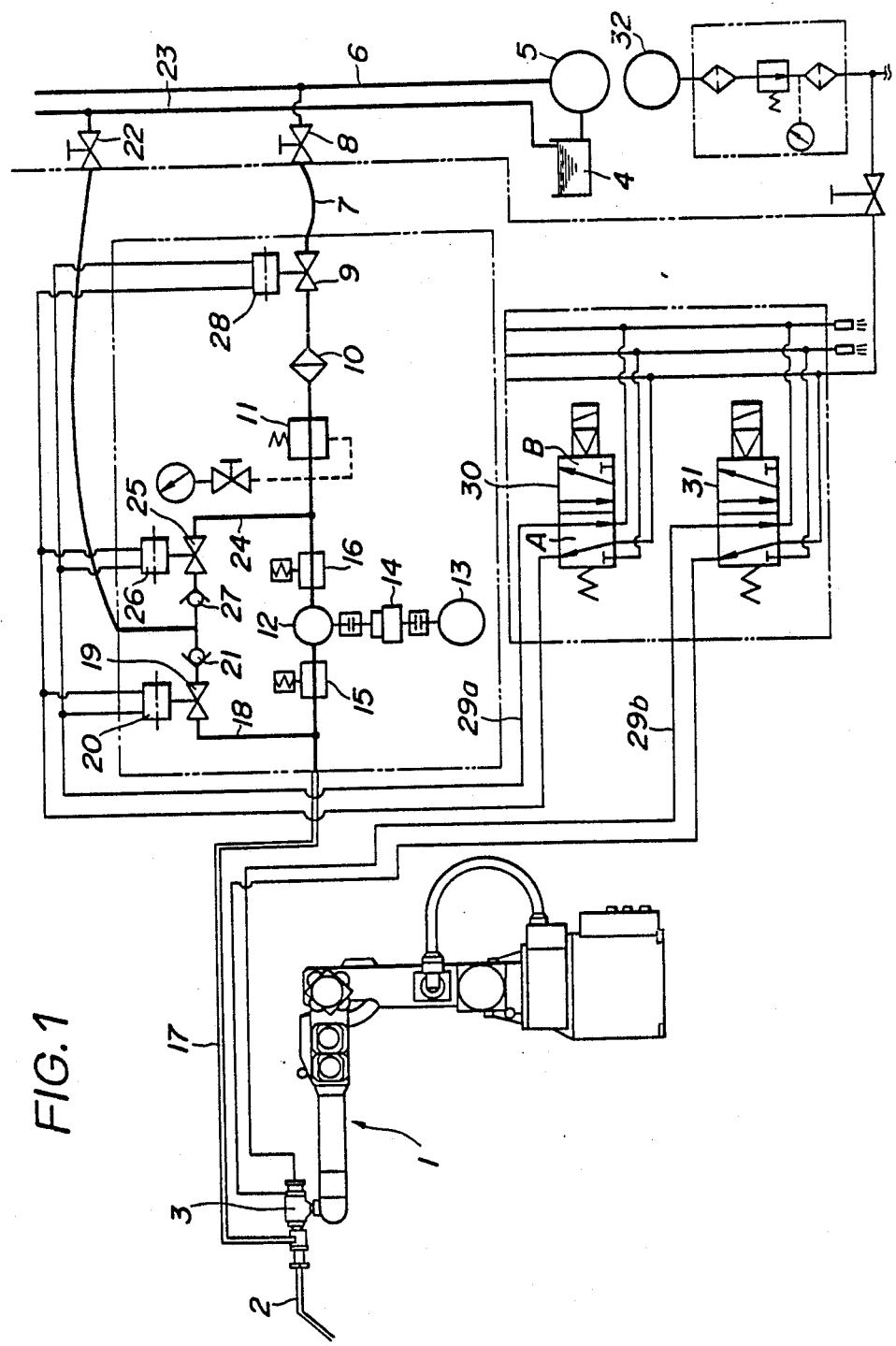
FIG. 1 is a schematic diagram of an overall coating agent supply system for supplying a coating agent to a coating robot, the coating agent supply system including an apparatus according to the present invention.

As shown in FIG. 1, a sealant applicator gun 3 having a sealant ejecting nozzle 2 is mounted on the distal end of an arm 1a of a sealing robot 1. The sealant applicator gun 3 can be opened and closed to supply and cut off a sealant from the nozzle 2.

A sealant supply line has a sealant storage tank 4 and a main pump 5 for pumping up a sealant from the sealant storage tank 4. The sealant pumped up by the main pump 5 is delivered through a main line 6 to individual lines 7 (only one shown) associated with respective sealing robots. The line 7 is coupled to a selector valve 8 disposed upstream thereof and a line shutoff valve 9 disposed downstream thereof. The line shutoff valve 9 is connected to a filter 10 positioned downstream thereof and coupled to a regulator 11 positioned downstream thereof. The regulator 11 is connected to a pump 12 disposed downstream thereof for supplying a fixed amount of a sealant, the pump 12 being operable by a motor 13 through a speed reducer 14.

A high-pressure sensor 15 is disposed in the pipe of the line 7 downstream of the pump 12 for detecting a pressure higher than a prescribed pressure level in the line pipe. A high/low-pressure sensor 16 is disposed in the pipe of the line 7 upstream of the pump 12 for detecting a pressure higher than a prescribed higher pressure level in the line pipe and a pressure lower than a prescribed lower pressure level in the line pipe. The high-pressure sensor 15 is coupled through a downstream pipe 17 to the sealant applicator gun 3 of the sealing robot 1 for supplying the sealant to the nozzle 2. A pressure relief passage 18 is branched from the line 7 upstream of the pipe 17 and downstream of the high-pressure sensor 15, the passage 18 having a relief valve 19. The relief valve 19 can be opened and closed by an actuator 20, the relief valve 19 being normally closed. A check valve 21 is disposed downstream of the relief valve 19 and coupled through a selector valve 22 to a return line 23 connected to the tank 4. Between the regulator 11 and the high/low-pressure sensor 16, there is connected a pressure relief passage 24 branched from the line 7 and having a relief valve 25 which can be opened and closed by an actuator 26. A check valve 27 is disposed downstream of the relief valve 25 and coupled to the return line 23 via the selector valve 22.

The actuators 20, 26 for the relief valves 19, 25 and an actuator 28 for operating the shutoff valve 9 are coupled to a solenoid-operated valve 30 through an air pressure passage 29a. The sealant applicator gun 3 is openable and closeable by a solenoid-operated valve 31 coupled thereto through an air pressure passage 29b. The solenoid-operated valves 30, 31 are coupled to an air pressure source 32. When the solenoid-operated valve 30 is in a position A (as shown in FIG. 1), the air pressure from the air presure source 32 causes the actuators 20, 26, 28 to keep the relief valves 19, 25 closed and also to keep the shutoff valve 9 open. Conversely, when the solenoid-operated valve 30 is in a position B, the air pressure from the air pressure source 32 causes the actuators 20, 26, 28 to keep the relief valves 19, 25 open and also to keep the shutoff valve 9 closed. The solenoid-operated valve 30 is normally in the position A against the spring bias with its solenoid energized when the power supply switch of the system shown in FIG. 1 is turned on.

The sealant stored in the tank 4 is delivered through the lines 6, 7, the filter 10, and the regulator 11 to the pump 12, and then pressurized by the pump 12 and supplied through the pipe 17 to the sealant robot 1. The sealant supplied to the sealant robot 1 is fed through the applicator gun 3 and ejected from the nozzle 2 toward an article to be sealed.

Figure 2:
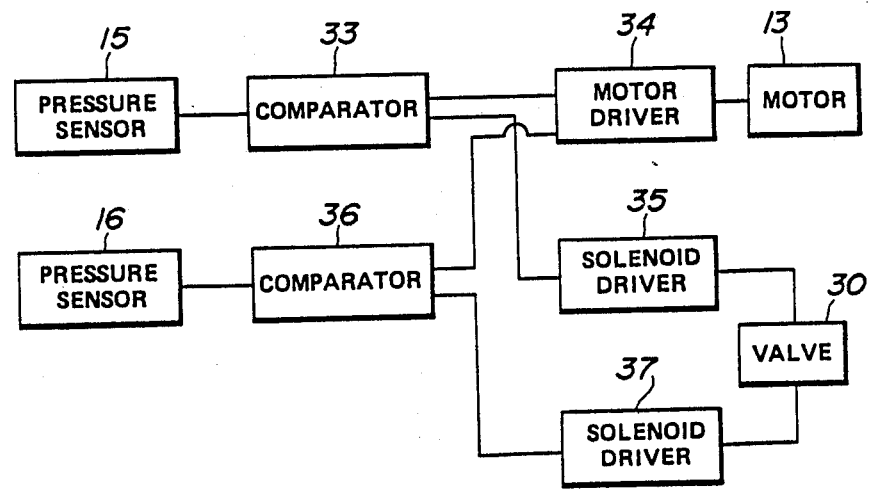
FIG. 2 is a block diagram of an electric control circuit for controlling a motor driver and solenoid drivers.

If the sealant pressure in the line 7 undergoes a change as detected by the pressure sensors 15, 16, then the motor 13 for operating the pump 12 and the actuaors 20, 26 for the relief valves 19, 25 are controlled as follows:

The output signal from the high-pressure sensor 15, which indicates the pressure in the line 7 downstream of the pump 12, is compared with a reference signal indicative of a prescribed pressure level by a comparator 33 shown in FIG. 2. When the pressure downstream of the pump 12 is higher than the prescribed pressure level due to a clog in the nozzle 2, for example, the comparator 33 applies a signal to a motor driver 34 to de-energize the motor 13, stopping the operation of the pump 12. At the same time, the output signal from the comparator 33 is sent to a solenoid driver 35 for thereby shifting the solenoid-operated valve 30 from the position A to the position B. Therefore, the actuator 20 opens the relief valve 19 to relieve the line 7 through the relief passage 18.

The output signal from the high/low-pressure sensor 16, which indicates the pressure in the line 7 upstream of the pump 12, is compared with reference signals indicative of prescribed higher and lower pressure levels by a comparator 36 shown in FIG. 2. When the pressure upstream of the pump 12 is higher than the higher pressure level, the comparator 36 applies a signal to the motor driver 34 to de-energize the motor 13 to stop the operation of the pump 12. The comparator 36 also applies its signal to a solenoid driver 37 to shift the solenoid-operated valve 30 from the position A to the position B, whereupon the relief valve 25 is opened by the actuator 26 to relieve the pipe 7 through the relief passage 24.

When the pressure upstream of the pump 12 is lower than the lower pressure level because of a sealant shortage, for example, the comparator 36 issues a signal to the motor driver 34 to turn off the motor 13, thus preventing the motor 13 from idly rotating. Simultaneously, the relief valve 25 is opened by the actuator 26.

When the sealant supply system stops its operation, the power supply switch is turned off to deenergize the solenoid of the solenoid-operated valve 30, which is then shifted to the position B under the spring bias. Thus, the relief valves 19, 25 are opened to release the pressure from the line 7 for thereby preventing the sealant from being solidified in line 7.

As described above, in the event of an undue pressure buildup or drop due to a clog or a sealant shortage, for example, the line 7 and the pump 12 are protected against damage or breakage because the pressure in the line 7 is released and the pump 12 is stopped in its operation at the same time. Upon shutdown of the entire system, the sealant is prevented from being solidified in the line 7 since the pressure in the line 7 is released.

Figure 3:
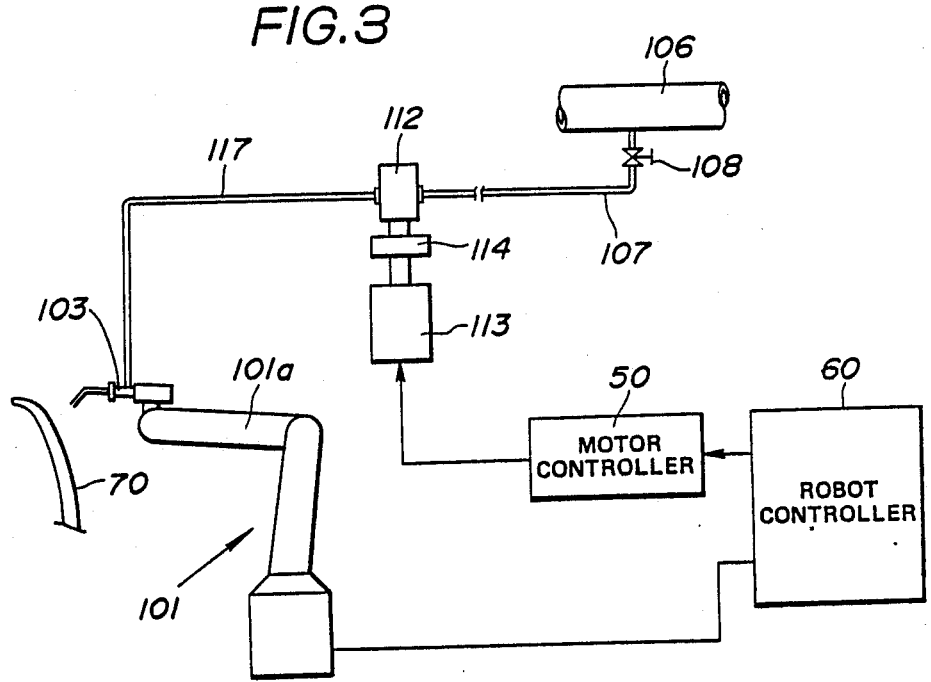
FIG. 3 is a diagram showing a control arrangement for controlling a motor which operates a pump in the coating agent supply system.

FIG. 3 schematically shows a control arrangement for controlling the rotational speed of a sealant supply pump with controller. Those parts which correspond to those shown in FIG. 1 are denoted by corresponding reference characters with the addition of "100".

A sealant is supplied through a main pipe 106. A gear pump 112 has an inlet port connected to the main pipe 106 through a branch pipe 107 and an outlet port coupled via a joint pipe 117 to a sealant applicator gun 103 mounted on a sealing robot 101, the branch pipe 107 having a valve 108.

The gear pump 112 has its rotatable shaft coupled to a servomotor 113 through a speed reducer 114. The gear pump 112 is operated by the servomotor 113 to discharge a constant amount of sealant per revolution of the rotatable shaft of the gear pump 112. The servomotor 113 is electrically connected to a motor controller 50 which controls energization of the servomotor 113.

The sealing robot 101 has an arm 101a on which the applicator gun 103 is supported. The sealing robot 101 is electrically connected to a robot controller 60, and is controllable by the robot controller 60 to move the applicator gun 103 with respect to an article 70 such as an automobile panel. More specifically, the sealing robot 101 is controlled by a robot control signal from the robot controller 60 to swing the arm 101a for moving the applicator gun 103 along an article area to which the sealant is to be applied.

The robot controller 60 is electrically coupled to the motor controller 50 for applying the robot control signal to the motor controller 50 also. The motor controller 50 determines the speed of rotation of the servomotor 113 based on the robot control signal supplied from the robot controller 60.

The sealant may be coated on the article by the applicator gun 103 either when the sealant is ejected from the applicator gun 103 that is positioned closely to the article 70 or when the sealant is ejected from the applicator gun 103 that is spaced a certain distance from the article 70.

The system shown in FIG. 3 operates as follows: The robot controller 60 controls the sealing robot 101 to move the applicator gun 103 relatively to the article 70, and also supplies the motor controller 50 with a robot control signal which represents the speed of relative movement of the applicator gun 113 with respect to the article 70. The motor controller 50 responds to the robot control signal from the robot controller 60 to control the servomotor 113 to keep the rotational speed of the servomotor 113 in proportion to the speed of relative movement of the applicator gun 103 with respect to the article 70. Therefore, the rate at which the sealant is discharged by the gear pump 112, i.e., the rate at which the sealant is applied by the applicator gun 103 to the article 70, varies proportionally to the speed of relative movement of the applicator gun 103 with respect to the article 70. As a result, the amount of the sealant applied to the article 70 per unit area that is coated with the sealant remains constant irrespective of the speed of relative movement of the applicator gun 103 with respect to the article 70. The area of the article 70 which is sealed by the applied sealant is therefore well sealed without the danger of losing the airtight and liquidtight structure or a neat appearance, which would otherwise be damaged by a sealant shortage or oversupply. The reference rate of applying the sealant can be determined by setting a reference rotational speed for the servomotor 113 when teaching the sealing robot 101 a path of travel (coating path) of the applicator gun 103.

An experiment conducted by the inventors indicated that when the reference rate of applying the sealant was set to 25 cc/m and the gear pump 112 having a discharging capability of 4.7 cc/rev. and the speed reducer 114 having a speed reduction ratio of 1/11 were used, the rate of application of the sealant could be uniformly kept at the reference rate by controlling the rotational speed of the servomotor 113 as shown in the following table:

| Speed of gun 103 (m/min) | Rate of discharge from gear pump 112 (cc/min) | Rotational speed of gear pump 112 (r.p.m.) | Rotational speed of servomotor 113 (r.p.m.) |
|---|---|---|---|
| 20 | 500 | 106.4 | 1170.4 |
| 15 | 375 | 79.8 | 877.8 |
| 10 | 250 | 53.2 | 585.2 |
| 5 | 125 | 26.6 | 292.6 |

While the stepwise control is shown in the above example by controlling the rotational speed of the servomotor 113 at discrete levels, the rotational speed of the servomotor 113 may also be controlled continuously. Further, the speed of travel of the applicator gun 103 may be detected directly by some suitable detector, rather than through the control signal from the robot controller 60.

The control system shown in FIG. 3 may be used in combination with or independently of the control system illustrated in FIG. 2.

The invention has been shown and described as being applied to an apparatus for supplying a sealant to an article such as an automobile body. However, the principles of the present invention may find various other uses such as an apparatus for supplying a paint, an adhesive, or any of various other meidums having a certain viscosity to a coating or applicator robot.

Although there has been described what is at present considered to be the preferred embodiment of the present invention, it will be understood that the invention may be embodied in other specific forms without departing from the spirit or essential characteristics thereof. The present embmodiment is therefore to be considered in all aspects as illustrative, and not restrictive. The scope of the invention is indicated by the appended claims rather than by the foregoing description.

We claim:
1. An apparatus for supplying a coating agent to a coating robot, comprising:
   a coating robot;
   a supply source of a coating agent;
   a supply line for supplying the coating agent in a direction of flow through said supply line from said supply source to said coating robot, said supply line including a supply pipe;
   a coating agent supply pump on said supply line;
   first and second pressure sensors disposed downstream and upstream, respectively, of said coating agent supply pump with respect to said direction of flow through said supply line, for detecting pressures in said supply pipe;
   branch lines extending from said supply line downstream of said first pressure sensor and upstream of said second pressure sensor, respectively;
   relief valves on said branch lines for opening and closing said branch lines, respectively, said relief valves having respective actuators;
   a pump driving device for driving said coating agent supply pump; and control means operatively connected between said first and second pressure sensors, and said actuators and said pump driving device for controlling said pump driving device and said actuators to stop operation of said coating agent supply pump and to open said relief valves when the pressure detected by either one of said first and second pressure sensors falls outside of a prescribed pressure range.

2. An apparatus according to claim 1, wherein said first pressure sensor detects pressures higher than a prescribed pressure level.

3. An apparatus according to claim 1, wherein said second pressure sensor detects pressures higher and lower than said prescribed pressure range.

4. An apparatus according to claim 1, wherein said actuators are arranged to normally keep the respective relief valves closed and to open the respective relief valves when a power supply switch of said supply source is turned off.

5. An apparatus according to claim 1, wherein said coating robot has a coating applicator movable with respect to an article to which the coating agent is to be applied by the coating robot, said control means being arranged to control said pump driving device for varying a rate at which the coating agent is discharged from said pump as a function of a speed of relative movement of said coating applicator with respect to said article.

6. An apparatus according to claim 5, further including robot controller means for controlling movement of said coating applicator with respect to said article, said robot controller means being arranged to apply a signal indicative of said speed to said control means, said control means being arranged to control said pump driving device for controlling said rate according to said signal.

7. An apparatus for supplying a coating agent to a coating robot, comprising:
a coating robot, said coating robot having a coating applicator movable with respect to an article to which a coating agent is to be applied by the coating robot;
a supply source of a coating agent;
a supply line for supplying the coating agent from said supply source to said coating robot;
a coating agent supply pump on an intermediate portion of said supply line;
a pump driving device for driving said coating agent supply pump;
a pressure sensor disposed in one of first and second positions which are located downstream and upstream, respectively, of said coating agent supply pump with respect to a direction of flow through said supply line, for detecting a pressure in said supply line; and
control means for controlling said pump driving device to vary a rate at which the coating agent is discharged from said pump as a function of a speed of relative movement of said coating applicator with respect to said article and for stopping operation of said coating agent supply pump when the pressure in said supply line detected by said pressure sensor falls outside of a prescribed pressure range.

8. An apparatus according to claim 7, further including robot controller means for controlling movement of said coating applicator with respect to said article, said robot controller means being arranged to apply a signal indicative of said speed to said control means, said control means being arranged to control said pump driving device for controlling said rate according to said signal.

9. An apparatus for supplying a coating agent to a coating robot, comprising:
a coating robot;
a supply source of a coating agent;
a supply line for supplying the coating agent in a direction of flow through said supply line from said supply source to said coating robot, said supply line including a supply pipe;
a coating agent supply pump on said supply line;
a pressure sensor disposed in one of first and second positions which are located downstream and upstream, respectively, of said coating agent supply pump with respect to said direction of flow through said supply line, for detecting a pressure in said supply pipe;
branch lines extending from said supply line downstream of said first position and upstream of said second position, respectively;
relief valves on said branch lines for opening and closing the branch lines, respectively, said relief valves being operable when the pressure in said supply pipe falls outside of a predetermined pressure range;
a pump driving device for driving said coating agent supply pump; and
control means operatively connected between said pressure sensor and said pump driving device for controlling said pump driving device to stop operation of said coating agent supply pump when the pressure in said supply pipe detected by said pressure sensor falls outside of said prescribed pressure range.

10. A method of supplying a coating agent to a coating robot, comprising the steps of:
detecting pressures in a supply pipe downstream and upstream of a coating agent supply pump on a coating agent supply line extending from a supply source of a coating agent to a coating robot;
releasing the pressure from said supply pipe through branch lines extending from the supply line downstream and upstream of said coating agent supply pump when the pressure in the supply pipe downstream or upstream of said coating agent supply pump falls outside of a prescribed pressure range; and
stopping operating of said coating agent supply pump.

11. A method according to claim 10, wherein pressures in said supply pipe higher than a prescribed pressure level are detected downstream of said coating agent supply pump.

12. A method according to claim 10, wherein pressures in said supply pipe higher and lower than the prescribed pressure range are detected upstream of said coating agent supply pump.

13. A method according to claim 10, wherein the pressure in said supply pipe is released when said coating agent supply line is shut off.

14. A method according to claim 10, wherein said coating robot has a coating applicator movable with respect to an article to which the coating agent is to be applied, a rate at which the coating agent is discharged by said coating agent supply pump being variable as a function of a speed of relative movement of said coating applicator with respect to said article when said coating agent supply pump is in operation.

15. A method of supplying a coating agent to a coating robot, comprising the steps of:
   detecting a pressure in a supply pipe downstream or upstream of a coating agent supply pump on a coating agent supply line extending from a supply source of a coating agent to a coating robot;
   releasing the pressure from said supply pipe through branch lines extending from the supply line downstream and upstream of said coating agent supply pump when the detected pressure falls outside of a prescribed pressure range; and
   stopping operation of said coating agent supply pump.

* * * * *

UNITED STATES PATENT AND TRADEMARK OFFICE
CERTIFICATE OF CORRECTION

PATENT NO. : 4,822,647

DATED : April 18, 1989

INVENTOR(S) : Hiroyoshi Nozaki et al.

It is certified that error appears in the above-identified patent and that said Letters Patent is hereby corrected as shown below:

Column 1, line 36, change "and" to -- an --.
Column 3, line 61, correct spelling of "presure" (second occurrence) to
            -- pressure -- .
Column 6, line 34, change "meidums" to -- mediums --;
        line 41, change "embmodiment" to -- embodiment --.
Column 8, line 48, (claim 10, line 14), change "operating" to -- operation--.
In The Abstract, line 9, change "an" (first occurrence) to -- a --.

Signed and Sealed this

Ninth Day of January, 1990

*Attest:*

JEFFREY M. SAMUELS

*Attesting Officer*   *Acting Commissioner of Patents and Trademarks*